E. W. BUCHANAN & F. T. CLOUD.
DASHBOARD ATTACHMENT.
APPLICATION FILED OCT. 2, 1915.
1,180,972.
Patented Apr. 25, 1916.
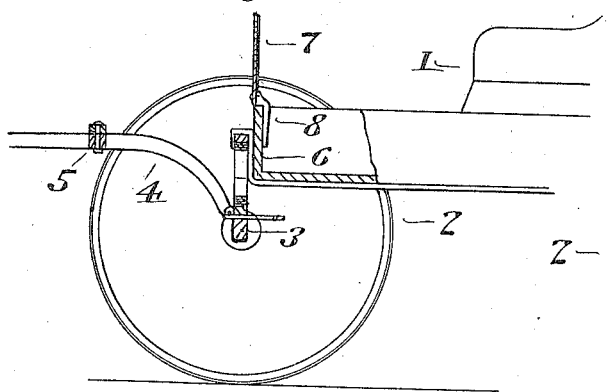
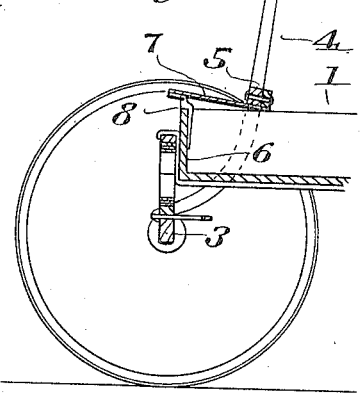
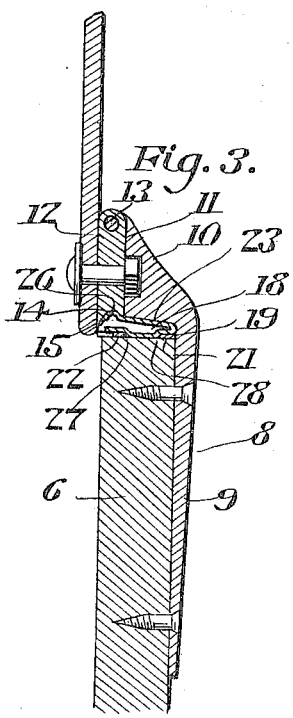
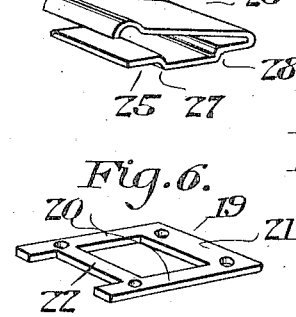
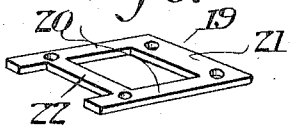
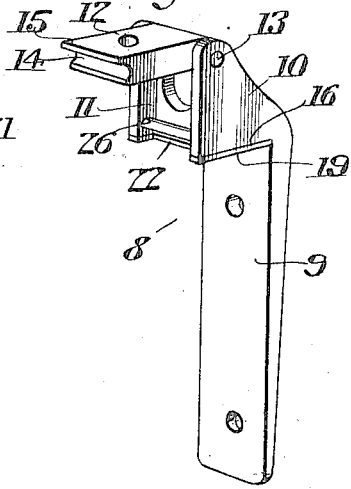
Inventors
E. W. Buchanan
F. T. Cloud
By Victor J. Evans
Attorney
Witness
M. H. Slifer

UNITED STATES PATENT OFFICE.

EDWARD WILLIAM BUCHANAN AND FRANKLIN TOMAS CLOUD, OF HOT SPRINGS, ARKANSAS, ASSIGNORS, BY MESNE ASSIGNMENTS, OF ONE-FOURTH TO MARTHA SHELTON OLSEN.

DASHBOARD ATTACHMENT.

1,180,972.  Specification of Letters Patent.  Patented Apr. 25, 1916.

Application filed October 2, 1915. Serial No. 53,828.

*To all whom it may concern:*

Be it known that we, EDWARD WILLIAM BUCHANAN and FRANKLIN T. CLOUD, citizens of the United States, residing at Hot Springs, in the county of Garland and State of Arkansas, have invented new and useful Improvements in Dashboard Attachments, of which the following is a specification.

This invention relates to improvements in attaching means for the dash boards of vehicle bodies, and the primary object of the invention is to provide a means whereby the dash board will be normally sustained vertically with the front of the body of the vehicle or whereby the same may be swung within the body to permit the cross or connecting bar of the shafts being swung over the dash board and so sustain the shafts against injury as well as affording comparatively small space for storage for the vehicle.

With the above and other objects in view, the improvement resides in the construction combination and arrangement of parts set forth in the following specification and falling within the scope of the appended claims.

In the drawings: Figure 1 is a view of a vehicle provided with our improvement, Fig. 2 is a view illustrating the dash board swung over the body of the vehicle and the shafts or thills swung at an inward angle with relation to the body so that the cross or connecting bar therefor rests upon the inwardly swung dash board, Fig. 3 is a central vertical sectional view through a portion of the front of the vehicle body and one of the connecting members secured thereto and connected with the dash board, Fig. 4 is a perspective view of the attachment, the block being shown in its open position, Fig. 5 is a perspective view of the spring catch for securing the pivoted block in locked position upon the bracket, Fig. 6 is a perspective view of a block which may be employed when the dash board is arranged at an angle to the front of the vehicle body.

In the drawing, the numeral 1 designates a portion of the body of a light vehicle, such as a buggy or surrey, 2 the front wheels, 3 the front axle, 4 the shafts or thills hingedly secured to the front axle and 5 the connecting bar for the said shafts or thills. The bar 5 is arranged a distance from the pivot of the thills sufficient to permit the same passing over the front board 6 of the body, but the dash 7 is ordinarily in the path of contact with the said connecting bar so that the thills cannot ordinarily be swung to other than an outward angle with relation to the body 1. To obviate this we provide suitable similarly constructed brackets 8, each of which includes an arm 9 which is secured in any desired manner to the inner face or front board 6 of the body. Formed with the arm 9 is an angular head member 10 which rests upon the upper edge of the front board 6, and this head has its outer face depressed or otherwise formed with a pocket 11 which is normally closed by what we will term a dash block indicated by the numeral 12 and which is pivoted between the upper walls provided by the pocket 11. This block 12 has its end opposite that through which the pivot 13 passes formed with a transverse concaved portion or depression 14, the said concavity providing the outer and lower edge of the said block with a lip 15. The right angular wall 16 of the head 10, which rests upon the upper edge of the block 6 is channeled, longitudinally, as at 18, the said channel communicating with the pocket 11. Secured upon the horizontal surface 16 below the channel 18 is a metallic frame 19. This frame includes longitudinally extending side arms 20 and an inner transverse connecting arm 21. The arms 20, at a suitable distance from the outer ends thereof are also connected by a transverse strap 22.

Adapted to be arranged within the channel 18 and to be supported by the frame 19 is a spring catch 23. This catch is formed from a single strip of resilient material of a length and width sufficient to be snugly received in the channel 18 and comprises an upper member 24 which is disposed at an outward angle from a lower member 25. The member 24 is formed, adjacent its free end, with a curved portion or lip 26 which is adapted to be received in the concavity or depression 14 of the block 12. The lower member 25 of the spring catch 23 is bent to provide transverse shoulders 27 and 28, the shoulder 27 contacting with the outer edge of the inner connecting member 21 of the frame 19 and the outer shoulder 28 engaging the inner edge of the connecting strap 22 of the said frame, the flat portion between the shoulders 27 and 28 being disposed within the space provided between the connected member 21 and the strap 23 of the frame.

By this arrangement it will be noted that the spring catch 23 may be inserted or removed from the bracket as desired, and also that the rounded lip portion 26 will firmly and securely engage within the concaved depression 14 of the block 12 when the said block is swung within the pocket 11. The finger 15, which is disposed forward of the connecting strap 22 of the frame 19 permits of the insertion of the finger of the operator so as to swing the block upon its pivot 13.

The dash 7 is secured to the block 12, and by reference to Fig. 2 it will be noted that when the block is swung the dash board will lie over the body 1 of the vehicle, and the thills or shafts swung over the said body, the said connecting bar 5 resting upon the swung dash, so that the vehicle will occupy only a comparatively small space in a carriage house. It is, of course, to be understood that the dash may be swung by the hand of the operator grasping the outer edge of the same to bring the dash either into its vertical position or to its horizontal position, and that the fingers 15 will not be essential.

Having thus described the invention, what we claim is:

1. The combination with a vehicle body, of brackets secured to the front board of the body, said brackets including a head, each of said heads having a vertically disposed pocket upon its outer face, a longitudinally extending channel upon its lower face, a block pivotally secured within the pocket, a spring arranged within the channel and contacting with the block for normally sustaining the same within the pocket, and a dash board secured to the blocks.

2. In combination with a vehicle body, of brackets secured to the front board of the body, said brackets each including a lateral head, the outer face of each of the heads being formed with a vertically disposed pocket, the lower faces of the heads having a channel communicating with the pocket, frames secured upon the lower face of the head and including connecting members, a block pivotally secured within each of the pockets, a two-arm spring arranged within the channel co-acting with the cross members of the frame for retaining the said spring within the channel, one of the arms of the spring being formed with an outwardly rounded lip which is disposed within the pocket, each of the blocks having one of its ends provided with a transverse depression to receive the lip of each of the springs, and a dash board secured to the blocks.

In testimony whereof we affix our signatures in presence of two witnesses.

EDWARD WILLIAM BUCHANAN.
FRANKLIN TOMAS CLOUD.

Witnesses:
H. L. RECHT,
MARIE SCHUEBLEN.

Copies of this patent may be obtained for five cents each, by addressing the "Commissioner of Patents, Washington, D. C."